(12) United States Patent
Stenglein et al.

(10) Patent No.: US 9,055,843 B2
(45) Date of Patent: Jun. 16, 2015

(54) DOMESTIC APPLIANCE WITH AN ELECTRONIC SAFETY SYSTEM AND A MECHANICAL LOCKING SYSTEM AND METHOD FOR OPERATING A DOMESTIC APPLIANCE

(75) Inventors: Christian Stenglein, Frankfurt am Main (DE); Thomas Steiner, Trebur (DE); Georg Boerger, Steinbach (DE); Sebastian Hottenrott, Idstein (DE); Sebastian Fiolka, Frankfurt am Main (DE); Yvonne Scholl, Frankfurt am Main (DE); Sabine Buhl-Remmel, Schwalbach (DE); Joern Riemer, Friedrichsdorf (DE)

(73) Assignee: Braun GmbH, Kronberg (DE)

( * ) Notice: Subject to any disclaimer, the term of this patent is extended or adjusted under 35 U.S.C. 154(b) by 737 days.

(21) Appl. No.: 13/314,623

(22) Filed: Dec. 8, 2011

(65) Prior Publication Data
US 2012/0080295 A1 Apr. 5, 2012

Related U.S. Application Data

(63) Continuation-in-part of application No. PCT/IB2010/052566, filed on Jun. 9, 2010.

(30) Foreign Application Priority Data

Jun. 30, 2009 (EP) .................................. 09008493

(51) Int. Cl.
*A47J 43/044* (2006.01)
*A47J 43/07* (2006.01)
*H01H 3/20* (2006.01)
*H01H 9/06* (2006.01)

(52) U.S. Cl.
CPC .... *A47J 43/0755* (2013.01); *A47J 2043/04427* (2013.01); *H01H 3/20* (2013.01); *H01H 9/06* (2013.01)

(58) Field of Classification Search
CPC ................. A47J 2043/04427; A47J 43/0755
USPC ............ 366/129, 331, 344; 99/348; 241/37.5, 241/46.15; 200/50.32; 307/326; 173/170
See application file for complete search history.

(56) References Cited

U.S. PATENT DOCUMENTS 5,368,384 A * 11/1994 Duncan et al. ................. 366/129
8,353,620 B2 * 1/2013 Ogrizek et al. ............... 366/129

(Continued)

FOREIGN PATENT DOCUMENTS

FR 2688676 A3 * 9/1993 ............ A47J 43/046
WO WO 03061913 7/2003

OTHER PUBLICATIONS

International Search Report, Date of mailing Dec. 11, 2010, 3 pages.

*Primary Examiner* — Charles Cooley
(74) *Attorney, Agent, or Firm* — James C Vago; Kim W Zerby

(57) ABSTRACT

The present invention relates to a hand blender having a processing tool for mixing or comminuting foodstuffs. The hand blender has an electric motor, a power source with a first pole electrically connected to the electric motor and a second pole electrically connected to the electric motor, a controller, first and second mechanical switches having a first position and a second position, an electromechanical element for detecting the position of the first mechanical switch, and an electrical switch for detecting the position of the second mechanical switch.

17 Claims, 3 Drawing Sheets

(56) References Cited

U.S. PATENT DOCUMENTS

| | | | |
|---|---|---|---|
| 8,757,287 B2* | 6/2014 | Mak et al. | 173/170 |
| 2008/0298164 A1* | 12/2008 | Wilson | 366/129 |
| 2009/0213685 A1* | 8/2009 | Mak et al. | 366/129 |
| 2009/0303830 A1* | 12/2009 | Wilson | 366/129 |
| 2011/0272506 A1* | 11/2011 | Boland et al. | 241/25 |
| 2012/0080295 A1* | 4/2012 | Stenglein et al. | 200/50.32 |
| 2014/0211584 A1* | 7/2014 | Glasgow | 366/129 |

* cited by examiner

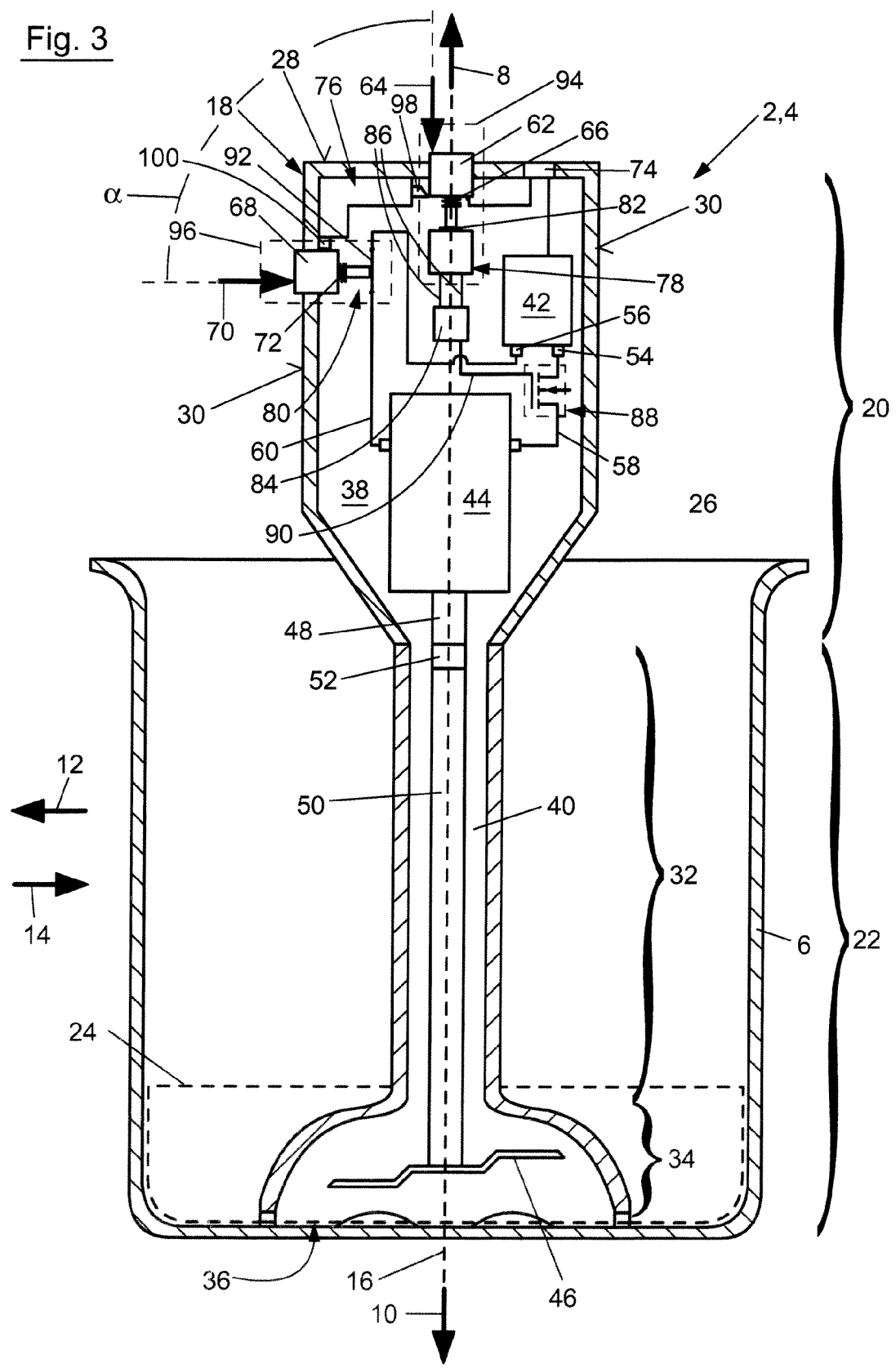

DOMESTIC APPLIANCE WITH AN ELECTRONIC SAFETY SYSTEM AND A MECHANICAL LOCKING SYSTEM AND METHOD FOR OPERATING A DOMESTIC APPLIANCE

CROSS REFERENCE TO RELATED APPLICATIONS

This application is a continuation-in-part of prior co-pending International Application No. PCT/IB2010/052566 filed Jun. 9, 2010, designating the United States.

FIELD OF THE INVENTION

The present invention relates to a domestic appliance with a power source being electrically connectable to an electrical motor for driving a processing tool, the domestic appliance comprising a first mechanical switch being manually switchable from a first position into a second position, a second mechanical switch being manually switchable from a first position into a second position, an electronic safety system with first means for detecting the position of the first mechanical switch and second means for detecting the position of the second mechanical switch, the electronic safety system being constructed such that the motor is only connected to one or both poles of the power source if both mechanical switches are switched into their second position and if the first mechanical switch is switched into its second position before the second mechanical switch is switched into its second position.

BACKGROUND OF THE INVENTION

A plurality of domestic appliances or kitchen appliances, like for example hand blenders, having a power source being electrically connectable to an electrical motor for driving a processing tool is already known from the state of the art. The known domestic appliances usually comprise a safety system in order to avoid an unintended start of the processing tool, which may lead to injuries, especially if the processing tool comprises movable blades or knifes.

DE 10 2005 038 919 A1 discloses a hand mixer with a battery serving as a power source, said power source being electrically connectable to an electrical motor for driving a processing tool. The known hand mixer comprises a manually switchable first mechanical switch, a so-called safety switch, and a manually switchable second mechanical switch, a so-called on/off-switch. The first mechanical switch and the second mechanical switch, respectively, may be independently switched from a first position into a second position by a finger of the user's hand grasping the hand mixer. There is further provided an electronic safety system, said electronic safety system comprising first means for detecting the position of the first mechanical switch and second means for detecting the position of the second mechanical switch. The electronic safety system is constructed such that the motor will only be connected to one or both poles of the power source if both mechanical switches are switched into their second position and if the first mechanical switch is switched into its second position before the second mechanical switch is switched into its second position. If the user does not switch the first mechanical into its second position, the second mechanical switch nevertheless may be switched into its second position, however, the second mechanical switch is electronically locked by the electronic safety system, so that the motor will not be connected to the power source even if the second mechanical switch is actuated. Thus, the opportunity of unintentionally operating the motor and the processing tool, respectively, is reduced and the safety of the hand mixer is increased.

The known hand mixer has proved himself insofar as the safety could be increased by using a safety switch and a separate on/off-switch in combination with an electronic safety system for electronically locking the on/off-switch if the safety switch is not actuated. However, high demands are made for such an electronic safety system, in order to avoid any malfunctions which may lead to an unintended start of the motor and the processing tool, respectively. These demands are for example described in IEC Standard 60335 of the International Electrotechnical Commission. Thus, extensive and time-consuming tests have to be carried out in order to comply with said standard and demands, respectively, so that the production of the known hand mixer with its electronic safety system is complicated and time-consuming. Further, if it is intended to change the software of the electronic safety system, said tests have to be carried out again, which leads to the aforementioned disadvantages. Above this, even if the safety of the known hand mixer is increased by using an electronic safety system, the safety of said hand mixer should further be increased in order to avoid malfunctions and thus injuries caused by an unintended start of the processing tool.

It is therefore an object of the present invention to provide a domestic appliance with two mechanical switches in combination with an electronic safety system, said domestic appliance on the one hand ensuring a further increased human safety and on the other hand reducing the efforts of testing the electronic safety system, so that the production of the domestic appliance is simplified. It is a further object of the present invention to provide a method for operating a domestic appliance increasing the safety of the domestic appliance and reducing the expenditure in manufacturing and testing.

SUMMARY OF THE INVENTION

The present invention is directed to a domestic appliance. The domestic appliance may for example be a kitchen appliance like a blender or a mixer. The domestic appliance in one embodiment is constructed as a handheld domestic appliance, i.e. the domestic appliance could be held in the user's hand during use. This is useful since most injuries of the user or a person in the vicinity of the user are caused by handheld domestic appliances which are not fixed to a stationary stand or base during use. The domestic appliance uses a power source being electrically connectable to an electrical motor for driving a processing tool. Basically, the power source may be placed outside the domestic appliance or may correspond to the power network, so that the domestic appliance has to be connected to the power source during use, however, the domestic appliance may be designed to be operated off the line as will be described later with reference to an embodiment of the invention. The domestic appliance further comprises a first mechanical switch, which could also be referred to as a safety switch, being manually switchable from a first position into a second position, and a second mechanical switch, which could also be referred to as an on/off-switch, being manually switchable from a first position into a second position. Basically, the mechanical switches may be formed by any kind of switch, however in one embodiment the mechanical switches are constructed as pushbuttons, for example having a finger support surface extending perpendicular to the moving direction of the pushbutton, in order to allow a direct transmission of the force applied by the finger of the user's hand. A mechanical switch in the sense of the invention may incorporate only those parts of a switch which do not have an electrical functionality even if the mechanical switch cooperates with an electrical switch or with an electromechanical element or is combined in a structural unit with an electrical switch or an electromechanical element.

According to the invention, the domestic appliance further comprises an electronic safety system with first means for detecting the position of the first mechanical switch and second means for detecting the position of the second mechanical switch. The electronic safety system only connects the motor to one or both poles of the power source, in order to start the motor and the processing tool, respectively, if at least the two following requirements are fulfilled. The first requirement is that both mechanical switches are switched into their second position. The second requirement is that the first mechanical switch is switched into its second position before the second mechanical switch is switched into its second position. Thus, the electronic safety system alone already ensures the same safety as the electronic safety system described in DE 10 2005 038 919 A1. However, according to the invention the domestic appliance additionally comprises a mechanical locking system in order to increase the safety. Said mechanical locking device is provided between the first and second mechanical switch, such that the mechanical locking system mechanically locks the second mechanical switch in its first position as long as the first mechanical switch is not switched into its second position. A mechanical locking system in the sense of the invention is only mechanically activated, i.e. the mechanical locking system is neither electrically nor electronically activated and driven, respectively.

As already mentioned above, the electronic safety system according to the invention already ensures the same safety standard as the electronic safety system mentioned in DE 10 2005 038 919 A1. By additionally using the mechanical locking system, the safety of the domestic appliance according to the invention could further be improved, especially if a malfunction occurs in the electronic safety system. Above this, the mechanical locking system cooperating with the mechanical switches already ensures a sufficient safety, so that the electronic safety system does not necessarily have to be an electronic safety system complying with IEC Standard 60335. Thus, the corresponding tests of the electronic safety system could be avoided, so that the production and approval of the domestic appliance is simplified, since only the mechanical locking system has to be tested, said tests being less extensive than the tests of an electronic safety system. Even if the software of the electronic safety system is changed, the unchanged mechanical locking system does not have to be tested again. Thus, the human safety of the domestic appliance according to the invention is increased, while the expenditure in manufacturing and testing is reduced.

In one embodiment of the domestic appliance according to the invention the first means for detecting the position of the first mechanical switch comprises an electromechanical element cooperating with the first mechanical switch such that an electrical signal is produced by actuating the first mechanical switch. The electrical signal, which may be a voltage signal, indicates whether the first mechanical switch has been switched into its second position or not, so that the electronic safety systems in principle allows to connect the power source to the motor if the corresponding electrical signal is produced by said electromechanical element. In order to provide a reliable electronic safety system, the electromechanical element may be formed by a piezo element, producing said electrical signal if the first mechanical switch exerts a force on the piezo element. It has been found that the reliability of the electronic safety system could further be increased by using an electromechanical element being formed by an electromechanical pushbutton.

In a further embodiment of the domestic appliance according to the invention the electronic safety system comprises connecting means for electrically connecting or disconnecting a first or a second pole, such as a first pole, of the power source to or from the motor depending on the electrical signals produced by the electromechanical element. Thus, in this embodiment the complete connecting of the power source to the motor is carried out progressively in order to ensure a high safety standard, i.e. first one pole of the power source is connected to the motor and the other pole of the power source will only be connected to the motor, if the second mechanical switch will be switched into its second position.

Basically, the aforementioned connecting means may be formed by any kind of switch or the like which is electrically actuated or driven. However, in a further embodiment of the domestic appliance according to the invention the connecting means comprises a MOSFET, i.e. a metal-oxide semiconductor field-effect transistor, in order to achieve a high switching speed of the connecting means.

The advantages of a combination of an electronic safety system with a mechanical locking system especially become evident in a further embodiment of the domestic appliance according to invention, in which the electronic safety system comprises a controller, said controller being constructed such that the motor is only connected to the power source if the second mechanical switch is switched into its second position within a predetermined actuation time limit after switching the first mechanical switch into its second position. Thus, the motor is only started if the second mechanical switch is switched into its second position within said predetermined actuation time limit, since the connection between the one pole of the power source and the motor established by the connecting means will be disconnected by the electronic safety system again, so that the motor could not be started any longer by manually actuating the second mechanical switch. This way, it is possible to ensure a high safety since it would make no sense for the user to permanently lock the first mechanical switch in its second position by an adhesive tape or the like in order to permanently bypass the mechanical locking system.

In a further embodiment of the domestic appliance according to the invention the controller of the electronic safety system is capable of receiving the electrical signals produced by the electromechanical element and of controlling the connecting means on basis of the received electrical signals.

It has been found that a safe as well as an easy handling of the domestic appliance could be achieved if the actuation time limit is more than 0.5 seconds. Thus, in a further embodiment of the domestic appliance according to the invention the actuation time limit is more than 0.5 seconds. In this embodiment the actuation time limit may be in a range from about 0.5 seconds to 5 seconds. With an actuation time limit longer than 5 seconds an unintended start of the motor and the processing tool, respectively, could normally not completely avoided.

In another embodiment of the domestic appliance according to the invention the actuation time limit is adjustable. There may for example be provided a corresponding actuator at the domestic appliance which allows a manual decreasing or increasing of the actuation time limit by the user so that the user can adjust the actuation time limit according to his needs. Especially if there are children in the household, the parents could decrease said actuation time limit in order to avoid the start of the motor and the processing tool, respectively, if a child grasps the domestic appliance and tries to start it by switching the mechanical switches one after another.

In a further embodiment of the domestic appliance according to the invention the electronic safety system is further adapted to detect the sequence in which the first mechanical switch and the second mechanical switch have been switched into their second position, the controller being constructed such that the motor is only connected to the power source if the second mechanical switch is switched into its second position after switching the first mechanical switch into its second position. For this purpose, there may for example be provided a further connecting means for electrically connecting or disconnecting a first or a second pole of the power source to or from the motor, e. g. a MOSFET. This way it is possible to ensure a high safety since it would make no sense for the user to permanently lock the second mechanical switch in its second position by an adhesive tape or the like.

In a further embodiment of the domestic appliance according to the invention the second means for detecting the position of the second mechanical switch comprises an electrical switch being switchable from a first position into a second position. The electrical switch cooperates with the second mechanical switch such that the electrical switch is switched from its first position into its second position if the second mechanical switch is switched from its first into its second position and vice versa. In its second position the electrical switch electrically connects the first or second pole, for example the second pole, of the power source to the motor. In its first position the electrical switch electrically disconnects said pole of the power source from the motor. Due to the fact, that the electrical switch is brought into its connecting or disconnecting state by moving the second mechanical switch into its respective positions, the motor could not be started as long as the second mechanical switch is in its first position even if a malfunction of the electronic safety system occurs. Thus, the electronic safety system of the invention can be an electronic safety system according to IEC Standard 60335, but does not need a system meeting all requirements of IEC Standard 60335. In the latter case, extensive tests of the electronic safety system can be avoided. It appears possible to already meet the requirements of IEC Standard 60335 by relying on the mechanical safety features as described herein. Hence, in one suitable production process only the mechanical locking system has to be checked, which can form the main safety system.

In a further embodiment of the domestic appliance according to the invention the first mechanical switch and the second mechanical switch are biased into their first position, i.e. said mechanical switches automatically return into their first position if no further external force is exerted on them. Then, the electrical switch as well as the electromechanical element automatically return into their first positions. In this embodiment the mechanical switches may comprise springs, such as coil springs, in order to bias them into their first position.

According to another embodiment of the domestic appliance according to the invention the second mechanical switch merely comprises mechanical elements, i.e. only mechanical elements with no electrical functionality, said mechanical elements cooperating with the mechanical locking system. Alternatively or additionally the first mechanical switch merely comprises mechanical elements, i.e. only mechanical elements with no electrical functionality, said mechanical elements cooperating with the mechanical safety system. Thus, the mechanical locking system is driven and/or actuated independently of the electronic safety system by the mechanical components of the mechanical switches.

In a further embodiment of the invention being based on the aforementioned embodiment, the second mechanical switch and the electrical switch are combined in a structural unit or/and the first mechanical switch and the first means for detecting the position of the first mechanical switch are combined in a structural unit. Both structural units ensure an easy assembly of the domestic appliance.

In order to further increase the safety of the domestic appliance according to another embodiment of the invention, the first mechanical switch is moveable in a first direction and the second mechanical switch is moveable into a second direction in order to achieve their second position, the first and second direction being different from each other. The moving directions may for example run contrary. However, in order to facilitate the handling of the mechanical switches the first and second direction may enclose an angle between 80° and 100°. In this connection, it has been found that an enclosed angle of 90° allows a very easy and comfortable handling of the domestic appliance.

In a further embodiment of the domestic appliance according to the invention the domestic appliance comprises an elongated handhold with the mechanical switches provided at it. By providing the mechanical switches at the handhold of the domestic appliance the user may easily grasp the handhold with one hand and start the domestic appliance via the mechanical switches with the same hand, so that the user is not forced to use the other hand and the handling of the domestic appliance is more comfortable and flexible.

In a further embodiment of the domestic appliance according to the invention one of said mechanical switches is provided at the front side of the handhold, the other mechanical switch being provided at the transverse side of the handhold. In this embodiment the mechanical switches may be arranged such that the mechanical switch at the front side is actuatable by the thumb of the users hand, while the mechanical switch at the transverse side is actuatable by another finger of the same hand, e. g. by the forefinger, if the user grasps the handhold with this hand, thereby facilitating the handling of the domestic appliance. As already mentioned before, in this embodiment the moving directions of the mechanical switches may be different and further may enclose an angle between 80° and 100°, for example an angle of 90°.

As already mentioned before, the power source of the domestic appliance may for example be an external power source. However, in order to provide an easy, flexible and independent handling in another embodiment of the domestic appliance according to the invention the domestic appliance is designed to be operated off the line with an integrated power source. Said power source may comprises at least one battery. Said battery may for example be a battery of the nonrechargeable type. However, the integrated power source may be rechargeable in order to avoid an extensive and time-consuming change of batteries.

In a further embodiment of the domestic appliance according to the invention a charge level indicator for indicating the charge level of the power source is provided, so that the user is enabled to check the charge level of the power source. The charge level indicator may consist of every kind of indicator being observable by the user. For example, the charge level indicator may comprise a lamp, e. g. an LED, which may for example change its color with respect to the charge level of the power source.

If a charge level indicator is used, said charge level indicator may show the corresponding charge level as long as the power source is in a charged condition. However, with the charge level indicator a further consumer load is established which will lead to a faster discharge of the power source. Thus, in a further embodiment of the domestic appliance according to the invention the charge level indicator is only activated if the first mechanical switch is switched into its second position. On the one hand, the user may find out the charge level of the power source by switching the first mechanical switch into the second position, on the other hand the power source is preserved if the domestic appliance is not in use. By establishing a co-operation between the first mechanical switch and the charge level indicator it is further ensured that the user is able check the charge level before the domestic appliance is started by switching the second mechanical switch into its second position.

In a further embodiment according to the invention the domestic appliance is a blender, for example a hand blender, including a rod shaped blender, for mixing and/or comminuting foodstuffs.

In a further embodiment of the domestic appliance according to the invention having the form of a blender one of the mechanical switches is provided at the front side of the handhold facing away from the work area of the blender. This mechanical switch may for example be actuated by the thumb of the user's hand while the same hand is holding the blender at the handhold.

In a further embodiment of the blender according to the invention the handhold is formed by a housing accommodating the electrical motor, the integrated power source, if applicable, the electronic safety system and the mechanical locking system. Thus, a very compact blender is achieved.

As already mentioned above, the mechanical locking system cooperating with the mechanical switches already ensures a sufficient safety, so that the electronic safety system does not necessarily has to be an electronic safety system complying with IEC Standard 60335. Thus, in a further embodiment of the domestic appliance according to the invention the electronic safety system is not an electronic safety system according to IEC Standard 60335, thereby eliminating the need for extensive tests of the electronic safety system and simplifying the production and approval of the domestic appliance.

The method for operating a domestic appliance, such as a handheld domestic appliance, for example a hand blender, with a power source being connectable to an electrical motor for driving a processing tool, comprises the steps described hereinafter. The position of a first mechanical switch being manually switchable from a first position into a second position as well as the position of a second mechanical switch being manually switchable from a first position into a second position is detected. One or both poles of the power source is/are electronically connected to the electrical motor if both mechanical switches are switched into their second position and if the first mechanical switch is switched into its second position before the second mechanical switch is switched into its second position. According to the method the second mechanical switch is mechanically locked in its first position as long as the first switch is not switched into its second position. Concerning the advantages of the method it is referred to the advantages described in connection with the domestic appliance according to the invention, which apply accordingly. The above described embodiments of the domestic appliance and their advantages apply accordingly to embodiments of the method.

BRIEF DESCRIPTION OF THE DRAWINGS

An embodiment of the present invention will now be described, by way of example only, with reference to the drawings in which FIG. 3 shows the domestic appliance of FIGS. 1 and 2 with the first mechanical switch in its second position and the second mechanical switch in its second position.

DETAILED DESCRIPTION OF THE DRAWINGS

Figure 1:
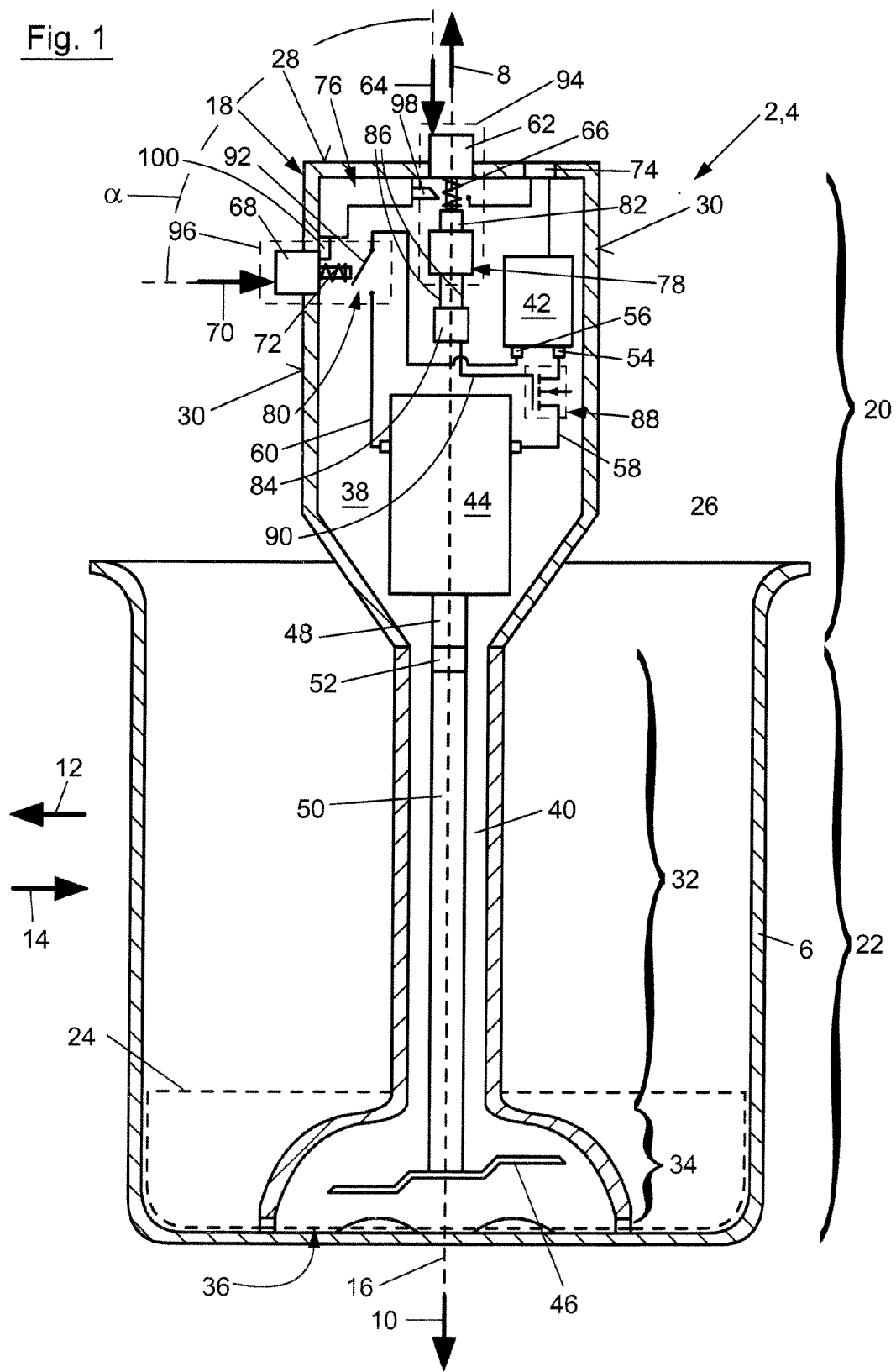
FIG. 1 shows a schematic cross-sectional side-view of an embodiment of the domestic appliance according to the invention, with the first mechanical switch in its first position and the second mechanical switch in its first position.

FIG. 1 shows an embodiment of the domestic appliance 2 according to the invention. The domestic appliance 2 is a handheld domestic appliance, in this case a hand blender 4 for mixing or comminuting foodstuffs (not shown). The foodstuffs are placed in a container 6, which is not a component of the hand blender 4. In FIG. 1, the opposing longitudinal directions 8, 10 and the Opposing radial directions 12, 14 of the hand blender 4 are indicated by corresponding arrows.

The hand blender 4 is rod shaped so that it is insertable in elongated containers 6 having small radial dimensions. The hand blender stretches along a longitudinal axis 16, said longitudinal axis 16 running in the longitudinal directions 8, 10. The hand blender 4 comprises a housing 18 for accommodating the further components of the hand blender 4.

The housing 18 of the hand blender 4 is divided into an upper housing portion 20 and a lower housing portion 22 following in the longitudinal direction 10, said lower housing portion 22 facing and at least partially extending into the work area 24 of the hand blender 4. The work area 24 is indicated by a dashed line in FIG. 1. While the lower housing portion 22 at least partially extends into the work area 24 of the hand blender 4, the upper housing portion 20 is placed at a distance from the work area 24, i.e. the upper housing portion 20 is placed upwards in the longitudinal direction 8.

The upper housing portion 20 of housing 18 forms an elongated handhold 26, which could be easily grasped by one of the user's hands (not shown). The handhold 26 comprises a front side 28 forming the end of the upper housing portion 20 in the longitudinal direction 8 and facing away from the work area 24 and the lower housing portion 22, respectively, of the hand blender 4. The handhold 26 further comprises transverse sides 30 facing in the radial directions 12. Thus, the user's thumb could be supported on the front side 28 of the handhold 26, while the other fingers and the palm of the same hand could be supported on the transverse sides 30 of the handhold 26, as will be described later.

The lower housing portion 22 is detachably mounted on the upper housing portion 20 and the handhold 26, respectively, so that the whole lower housing portion 22 could be released from the handhold 26 and replaced with another component. The lower housing portion 22 may further be subdivided into a tubular section 32 being connected to the upper housing portion 20 and a bell-shaped section 34 following in the longitudinal direction 10, said bell-shaped section 34 having an opening 36 being directed into the longitudinal direction 10. Thus, foodstuffs may enter the bell-shaped section 34 in order to reach the processing tool, which will be described later. However, even the fingers of a user or another body part may enter the bell-shaped section 34 via opening 36 so that there is a high risk of injury if the processing tool is unintentionally started. The present invention helps to reduce the risk of injury.

The upper housing portion 20 and the handhold 26, respectively, enclose a first accommodation space 38, while the lower housing portion 22 encloses a second accommodation space 40. Inside the first accommodation space 38 there is arranged a power source 42 and an electrical motor 44 for driving the aforementioned processing tool 46. The processing tool 46 may for example be a mixing tool or a cutter blade, the latter being shown in FIG. 1. The processing tool 46 is arranged inside the bell-shaped section 34 of the lower housing portion 22 and coupled with an output shaft 48 of the electrical motor 44 via a working shaft 50 extending through the second accommodation space 40 inside the tubular section 32 of the lower housing portion 22 and along the longitudinal axis 16. Thus, the longitudinal axis 16 may also be referred to as the rotation axis of the hand blender 4. In this embodiment, the working shaft 50 is coupled with the output shaft 48 via an unlockable coupling 52. Since the coupling 52 is unlockable, the lower housing portion 22, the working shaft 50 and the processing tool 46 being attached thereto may be detached from the hand blender 4.

In the shown embodiment, the power source 42 is integrated into the hand blender 4 and formed by at least one rechargeable battery, so that the hand blender 4 is designed to be operated off the line. The power source 42 further comprises a first and a second pole 54, 56 forming the electrical connections of the power source 42. The first pole 54 may be electrically connected to the motor 44 via a first line 58, while the second pole 56 may be electrically connected to the motor 44 via a second line 60 in order to establish the power supply of the motor 44 and to start the same.

Figure 2:
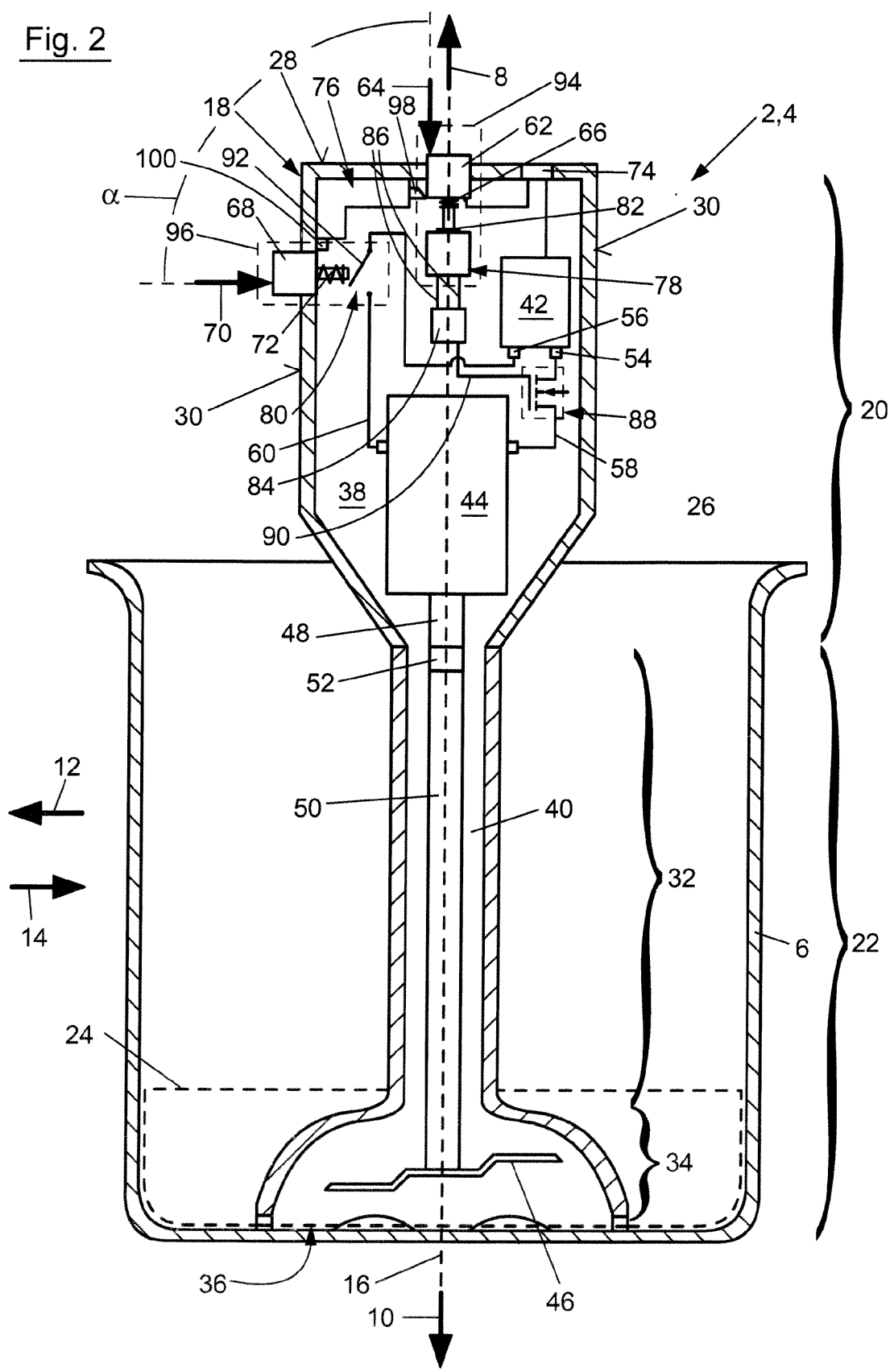
FIG. 2 shows the domestic appliance of FIG. 1 with the first mechanical switch in its second position and the second mechanical switch in its first position.

The hand blender 4 further comprises a first mechanical switch 62, which may also be referred to as the safety switch of the hand blender 4. The first mechanical switch 62 is provided at the front side 28 of the upper housing portion 20 and the handhold 26, respectively, and may be switched manually from a first position shown in FIG. 1 into a second position shown in FIGS. 2 and 3. As can be seen from FIGS. 1 and 2, the first mechanical switch 26 is moveable in a first direction 64 in order to achieve the second position which is shown in FIGS. 2 and 3, said first direction 64 may correspond to the longitudinal direction 10. The first mechanical switch 62 is further biased into its first position shown in FIG. 1 by way of a spring element, which is formed by a coil spring 66 in this embodiment, so that the first mechanical switch 62 automatically returns into its first position if the first mechanical switch 62 is released.

The hand blender 4 further comprises a second mechanical switch 68, which may also be referred to as the on/off-switch of the hand blender 4. The second mechanical switch 68 is provided at the transverse side 30 of the upper housing portion 20 and the handhold 26, respectively, and may be switched manually from a first position shown in FIGS. 1 and 2 into a second position shown in FIG. 3. As can be seen from FIGS. 2 and 3, the second mechanical switch 68 is moveable in a second direction 70 in order to achieve the second position which is shown in FIG. 3, said second direction 70 may correspond to the radial direction 14. The second mechanical switch 68 is as well biased into its first position shown in FIGS. 1 and 2 by way of a spring element, which is formed by a coil spring 72 in this embodiment, so that the second mechanical switch 68 automatically returns into its first position if the second mechanical switch 68 is released.

The first and the second direction 64, 70 in which the mechanical switches 62, 68 may be moved in order to achieve their second positions are different from each other. For example, said moving directions may enclose an angle α between 80° and 100°, for example said angle α may be 90° as can be seen in FIG. 1. Both mechanical switches 62, 68 are arranged at the handhold 26 such that the first mechanical switch 62 at the front side 28 may be actuated by the thumb of the user's hand (not shown), while the second mechanical switch 68 at the transverse side 30 may be actuated by another finger of the same hand, if the user grasps the handhold 26 with this hand.

At the front side 28 of the handhold 26 there is further provided a charge level indicator 74 for indicating the charge level of the power source 42. Said charge level indicator 74 in the shown embodiment is formed by a lamp, for example an LED, said lamp changing its color with respect to the charge level of the power source 42. However, said charge level indicator 74 is only activated and only indicates the charge level, respectively, if the first mechanical switch is switched into its second position shown in FIGS. 2 and 3, so that the hand blender 4 is energy saving if it is not in use.

Inside the accommodation space 38 of the upper housing portion 20 and the handhold 26, respectively, there is further provided an electronic safety system (no reference sign) and a mechanical locking system 76. First, the electronic safety system will be described with reference to FIG. 1.

The electronic safety system comprises first means 78 for detecting the position of the first mechanical switch 62 and second means 80 for detecting the position of the second mechanical switch 68. The first means 78 for detecting the position of the first mechanical switch 62 comprises an electromechanical element 82, for example a piezo element or an electromechanical pushbutton, the latter being shown in FIGS. 1 to 3. The electromechanical element 82 cooperates with the first mechanical switch 62 such that an electrical signal, for example a voltage signal, is produced by actuating the first mechanical switch 62, i.e. in this embodiment a voltage signal is produced by switching the first mechanical switch 62 into its second position (FIG. 2). The electrical signals may be received by a controller 84 of the electronic safety system via lines 86, said controller 84 being arranged inside the accommodation space 38 of the upper housing portion 20 and the handhold 26, respectively.

The electronic safety system further comprises connecting means 88 being arranged in line 58 which connects the first pole of the power source 42 to the motor 44. The connecting means 88 for connecting or disconnecting line 58 to or from the motor 44 in this embodiment comprises a metal-oxide field-effect transistor (MOSFET), said MOSFET being controlled by the controller 84 via a control line 90, i.e. the controller 84 disconnects or connects line 58 on basis of the electrical signals received from the electromechanical element 78.

The second means 80 for detecting the position of the second mechanical switch 68 comprises an electrical switch 92. Said electrical switch 92 may be manually switched from a first position shown in FIGS. 1 and 2 into a second position shown in FIG. 3. The electrical switch 92 cooperates with the second mechanical switch 68 such that the electrical switch 92 is switched from its first position (FIGS. 1 and 2) into its second position (FIG. 3) if the second mechanical switch 68 is switched from its first into its second position and vice versa. The electrical switch is placed in line 60 which connects the second pole 56 of the power source 42 to the motor 44. Thus, in its second position the electrical switch 92 connects the second pole 56 of the power source 42 to the motor 44 by connecting line 60, while in its first position the electrical switch 92 disconnects said pole 56 of the power source 42 from the motor 44 by interrupting line 60. An electrical switch 92 in the sense of the invention could therefore be described as a mechanical switch further having components with an electrical functionality, that is to say components for electrically connecting the power source 42 to the motor 44. Thus, the electrical switch 92 causes that the electronic safety system is not an electronic safety system in the sense of EEC Standard 60335, so that an extensive testing of the electronic safety system could be avoided.

The first mechanical switch 62 and the first means 78 for detecting the position of the first mechanical switch 62 are combined in a first structural unit 94, so that the assembly is facilitated. In a similar way, the second mechanical switch 68 and the electrical switch 92 are combined in a second structural unit 96 in order to achieve the aforementioned advantages. However, only those components of the structural units 94 or 96 having no electrical functionality are part of the mechanical switches 62 or 68, i.e. the first and the second mechanical switch 62, 68 in the sense of the invention merely comprise mechanical elements, while any components of the structural units 94, 96 with an electrical functionality belong to the first means 78 and the electrical switch 92, respectively. Only the aforementioned mechanical components are cooperating with the mechanical locking system 76, which will be described hereinafter.

The mechanical locking system 76 is provided inside the accommodation space 38 of the upper housing portion 20 and the handhold 26, respectively, between the described first and second mechanical switch 62, 68. The mechanical locking system 76 may be formed by any mechanism which mechanically locks the second mechanical switch 68 in its first position as long as the first mechanical switch 62 is not switched into its second position, i.e. as long as the first mechanical switch 62 is in its first position. The mechanical locking system 76 is not controlled by the controller 84 of the electronic safety system and may only contain mechanical components. In this embodiment, the mechanical locking system 76, which is only schematically shown in the figures, comprises a handle 98 cooperating with the first mechanical switch 62 and a lock bar 100 cooperating with the second mechanical switch 68.

The operating mode of the domestic appliance 2 and the method according to the invention, respectively, will now be described with reference to FIGS. 1 to 3.

Referring to FIG. 1, if a user grasps the handhold 26 and tries to switch the second mechanical switch 68 into its second position, this will be avoided by the lock bar 100 of the mechanical locking system 76. Thus, an unintentionally start of the motor 44 and the processing tool 46, respectively, will be avoided, so that the injury risk is reduced. In order to start the motor 44, first of all the user will have to switch the first mechanical switch 62 from its first position (FIG. 1) into its second position, as shown in FIG. 2.

By switching the first mechanical switch 62 into its second position, the first mechanical switch 62 cooperates with the handle 92 of the mechanical locking system 76, so that the lock bar 100 is moved in a position in which the second mechanical switch 68 is no longer mechanically locked in its first position. Further, the first mechanical switch 62 cooperates with the first means 78, i.e. with the electromechanical element 82, so that the electromechanical element 82 produces an electrical signal being received by the controller 84 via lines 86. If the controller 84 receives said electrical signals, the controller 84 controls the connecting means 88 via control line 90 such that the connecting means 88 in line 58 establish an electrical connection between the first pole 54 of the power source 42 and the motor 44.

After the second mechanical switch 68 has been unlocked and the electrical connection between the first pole 54 of the power source 42 and the motor 44 has been established, the user may switch the second mechanical switch 68 from its first position (FIG. 2) into its second position (FIG. 3), if he is still holding the first mechanical switch 62 in its second position. By switching the second mechanical switch 68 into its second position, the electrical switch 92 cooperating with the second mechanical switch 68 establishes an electrical connection between the second pole 56 of the power source 42 and the motor 44, so that the motor 44 is power supplied and starts driving the processing tool 46.

In order to avoid any misuse, e. g. by permanently locking the first mechanical switch 62 in its second position by an adhesive tape or the like in order to bypass the mechanical locking system 76, said controller 84 is constructed such that the motor 42 is only connected to the power source 44 if the second mechanical switch 68 is switched into its second position within a predetermined actuation time limit after switching the first mechanical switch 62 into its second position. This may for example be established by a controller 84 which measures the time after the first mechanical switch 62 has reached its second position and the controller 84 has received the electrical signal from the first means 78, respectively. If the measured time is longer than the predetermined actuation time limit, the controller 84 sends a corresponding control signal via control line 90 to the connecting means 88 or the MOSFET, so that line 58 will be interrupted and the first pole 54 of the power source 42 is no longer connected to the motor 44. Thus, even if the user switches the second mechanical switch 68 into its second position after the predetermined actuation time limit, there will be no electrical connection between the first pole 54 and the motor 44, so that the motor will not start.

The actuation time limit should be more than 0.5 seconds, for example the actuation time may be in a range from about 0.5 seconds to 5 seconds. Further the actuation time limit may be adjustable. There may for example be provided a corresponding actuator at the housing 18 of the hand blender 4, which allows a manual decreasing or increasing of the actuation time limit by the user so that the user can adjust the actuation time limit according to his needs.

In order to increase the safety of the hand blender 4 and to further avoid misuse, e. g. by permanently locking the second mechanical switch 68 in its second position by an adhesive tape or the like, the electronic safety system is further adapted to detect the sequence in which the first mechanical switch 62 and the second mechanical switch 68 have been switched into their second position. The controller 84 is constructed such that the motor 44 is only connected to the power source 42 if the second mechanical switch 68 is switched into its second position after the first mechanical 62 has been switched into its second position. For this purpose, there may for example be provided a further connecting means (not shown) for electrically connecting or disconnecting a first or a second pole of the power source 42 to or from the motor 44, e. g. a MOSFET. Alternatively, the connecting means 88 may be used.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A hand blender, comprising:
   an elongate housing comprising a lower housing portion and an upper housing portion, the upper housing portion comprising a handhold and the lower housing portion comprising a tubular portion adjacent the upper housing portion and a processing tool located at a distal end the lower housing portion for mixing or comminuting foodstuffs;
   an electric motor disposed in the upper housing portion and operatively coupled to the processing tool;
   a power source disposed in the upper housing portion having a first pole electrically connected to the electric motor and a second pole electrically connected to the electric motor;
   a controller;
   a first mechanical switch located on the upper housing portion, the first mechanical switch having a first position and a second position;
   an electromechanical element disposed in the upper housing portion for detecting the position of the first mechanical switch, wherein the electromechanical element produces an electrical signal that is received by the controller when the first mechanical switch is moved to the second position and wherein the electrical connection between the first pole and the electric motor is interrupted by the controller when the first mechanical switch is in the first position and the electrical connection between the first pole and the electric motor is completed when the first mechanical switch is in the second position;
   a second mechanical switch located on the upper housing portion, the second mechanical switch having a first position and a second position;
   an electrical switch disposed in the upper housing portion for detecting the position of the second mechanical switch, wherein the electrical connection between the second pole and the electric motor is interrupted by the electrical switch when the second mechanical switch is in the first position and the electrical connection between the second pole and the electric motor is completed by the electrical switch when the second mechanical switch is in its second position;
   a mechanical lock provided between the first mechanical switch and the second mechanical switch, wherein the mechanical lock locks the second mechanical switch in its first position as long as the first mechanical switch is not moved to its second position; and
   wherein the electric motor is only connected to both poles of the power source if both the first mechanical switch and the second mechanical switch are in their second positions and if the first mechanical switch is moved to its second position before the second mechanical switch is moved to its second position.

2. The hand blender according to claim 1, wherein the electromechanical element is selected from a piezo element or an electromechanical pushbutton cooperating with the first mechanical switch such that the electrical signal is a voltage signal produced by actuating the first mechanical switch.

3. The hand blender according to claim 1 wherein the controller is constructed such that the electric motor is only connected to the power source if the second mechanical switch is switched into its second position within a predetermined actuation time limit after switching the first mechanical switch into its second position.

4. The hand blender according to claim 3 wherein the predetermined actuation time limit is more than 0.5 seconds.

5. The hand blender according to claim 3 wherein the predetermined actuation time limit is in a range from about 0.5 seconds to 5 seconds.

6. The hand blender according to claim 3 wherein the predetermined actuation time limit is adjustable.

7. The hand blender according to claim 1, wherein the first mechanical switch and the second mechanical switch are biased into their first positions.

8. The hand blender according to claim 1, wherein the first mechanical switch is moveable in a first direction and the second mechanical switch is moveable into a second direction in order to achieve their second positions, the first and second direction being different.

9. The hand blender according to claim 8 wherein the first and second directions enclose an angle ($\alpha$) between 80° and 100°.

10. The hand blender according to claim 1, wherein one of the first and second mechanical switches are provided at the front side of the handhold, the other mechanical switch being provided at the transverse side of the handhold, the first and second mechanical switches being arranged such that the mechanical switch at the front side is actuatable by the thumb of the users hand while the mechanical switch at the transverse side is actuatable by another finger of the same hand when the user grasps the handhold with this hand.

11. The hand blender according to claim 1, wherein the power source comprises at least one battery and wherein further a charge level indicator for indicating the charge level of the power source is provided.

12. The hand blender according to claim 1, wherein one of the mechanical switches is provided at the front side of the handhold facing away from the work area of the hand blender.

13. The hand blender according to claim 1, further comprising a MOSFET disposed between the first pole of the power source and the electric motor for connecting or disconnecting the first pole of the power source to or from the motor depending on the electrical signal produced by the electromechanical element, the MOSFET being controlled by the controller.

14. The hand blender according to claim 13, wherein the controller receives the electrical signal of the electromechanical element and controls the MOSFET.

15. The hand blender according to claim 1, wherein the mechanical lock further comprises a one or more bars for mechanically locking the second mechanical switch.

16. The hand blender according to claim 1, wherein the processing tool is a mixing tool or a cutter blade.

17. The hand blender according to claim 16, wherein the processing tool is coupled to the electric motor by a shaft that extends through the tubular portion.

* * * * *